United States Patent [19]

Kamimura et al.

[11] Patent Number: 4,520,224

[45] Date of Patent: May 28, 1985

[54] THERMAL CRACKING METHOD FOR PRODUCING OLEFINS FROM HYDROCARBONS

[75] Inventors: Yoshihiko Kamimura; Toshiro Okamoto, both of Tokyo; Naoyuki Takahashi, Hiroshima; Hiroshi Makihara, Hiroshima; Michio Oshima, Hiroshima, all of Japan

[73] Assignee: Mitsubishi Jukogyo Kabushiki Kaisha, Japan

[21] Appl. No.: 473,761

[22] Filed: Mar. 9, 1983

[30] Foreign Application Priority Data

Mar. 11, 1982 [JP] Japan .................................. 57-38684

[51] Int. Cl.$^3$ ................................................ C07C 4/02
[52] U.S. Cl. .................................... 585/648; 585/650; 208/107
[58] Field of Search ................. 585/648, 650; 208/107

[56] References Cited

U.S. PATENT DOCUMENTS

| | | | |
|---|---|---|---|
| 2,666,734 | 1/1954 | Finalay ................................ | 585/648 |
| 2,678,956 | 5/1954 | Hasche ................................ | 585/650 |
| 2,985,698 | 5/1961 | Pechtold et al. ..................... | 585/650 |
| 3,268,615 | 8/1966 | Keenan et al. ...................... | 585/650 |
| 3,842,138 | 10/1974 | Chahvekilian et al. ............. | 585/648 |

Primary Examiner—Delbert E. Gantz
Assistant Examiner—Cynthia A. Prezlock
Attorney, Agent, or Firm—Wyatt, Gerber, Shoup, Scobey and Badie

[57] ABSTRACT

A thermal cracking method for producing olefins from hydrocarbons which comprises the steps of mixing said hydrocarbons with a mixed gas of methane and hydrogen in a methane/hydrogen mol ratio of 0.2 or more; prior to reaction carrying out a thermal cracking reaction under conditions such that the total concentration of methane and hydrogen is at least 40 mol % or more at the outlet of a reactor, the partial pressure of said hydrogen is 3 bars or more, the temperature at the outlet of the reactor is from 800° to 1200° C., and the residence time in the reactor is from 5 to 300 milliseconds; and quenching the reaction product discharged through the outlet of the reactor.

4 Claims, 12 Drawing Figures

THERMAL CRACKING METHOD FOR PRODUCING OLEFINS FROM HYDROCARBONS

The present invention relates to a method for producing olefins, particularly ethylene and propylene by a thermal cracking of hydrocarbons under pressure and in the presence of of methane and hydrogen.

The thermal steam cracking process is well known and has heretofore been employed to convert, into olefins, light gaseous hydrocarbons such as ethane and propane as well as liquid hydrocarbons such as naphtha and kerosine. According to this process, steam is employed as a heat transfer medium for prompt heating and as a diluent medium for preventing deposition of coke and tar, and hydrocarbons are converted into olefins by a gaseous phase reaction. In the case of producing olefins by this process. To prevent disadvantageous side reactions this process is conducted under a low pressure as close as possible to atmospheric pressure and at a very high dilution of steam. The reaction conditions generally employed are a reaction temperature of 850° C. or less and a residence time ranges from 0.1 to 0.5 second. Several alternative processes been suggested where cracking is accomplished in the presence of hydrogen.

In one such process thermal cracking is carried out in an atmosphere of hydrogen at atmospheric pressure, whereby the yield of ethylene is increased and simultaneously coking is restrained. In this process, however, in order to separate substantial amount of recycled hydrogen gas from the reaction gas effluent, it is required to compress the reaction gas up to a pressure which may be as high as 20 to 40 bars. Because of the large power requirements for the compression, the suggested process is inferior economically to steam cracking, though being excellent in the yield of ethylene. Further, coking of gas oil and other heavier oils it in the first process is not or only slightly prevented, though coking of light oils such as naphtha and kerosine is effectively reduced.

Another process comprises the step of carrying out a reaction under pressure for the purpose of overcoming the drawbacks of the first process just described. This process attempts to obtain a high yield of olefins by cracking a hydrocarbon material under the conditions that the concentration of hydrogen at the outlet of the reactor is 20% or more, the pressure is within 5 to 70 bar, the reaction temperature is 625° C. or more and the residence time is 0.5 second or less. In this suggested process, pressurized hydrogen is utilized, whereby the power for compression in a separation system is reduced and the generation of coke is suppressed. Moreover, the process characteristically makes use of the fact that hydrogenation is exothermic, in order to reduce the quantity of the heat which is necessary for the maintenance of reactions and which is to be fed from outside.

A third process comprises blowing oxygen into a hydrogen stream to partially burn the hydrogen with the oxygen to raise the temperature of the hydrogen stream; injecting atomized droplets of a liquid hydrocarbon material into the high-temperature hydrogen stream to produce a reaction mixture having a temperature within the range of 800° to 1800° C.; maintaining this temperature for a period of 1 to 10 milliseconds; and quenching the reaction mixture below about 600° C. within as short a period of time as about 2 milliseconds or less.

These processes all have a disadvantage which is attributable to thermal cracking in the presence of hydrogen. The disadvantage is that valuable olefins produced by reactions are hydrogenated by the hydrogen resulting in the conversion into methane, ethane and propane which are less valuable. The ethane and propane can easily be converted to ethylene and propylene by steam cracking, but it is difficult to convert methane into an olefin by economical means, and what is worse, the production of the methane involves the consumption of the valuable hydrogen. As a result valuable hydrogen is consumed to produce less valuable methane and this causes great economic loss. Another serious problem, which results from the production of the methane by the hydrogenation of the olefins, is that the hydrogenation reaction is highly exothermic and the reaction temperature is accordingly raised. Since the hydrogenation reaction progresses vigorously at high temperature, the production of the methane is accelerated more and more, and as a result, a runaway reaction occurs. In consequence, the yield ethylene is reduced and the production of the methane increased, so that it is difficult to maintain the yield of the olefins at a high level. This tendency occurs even at atmospheric pressure but is particularly noticeable in a high-hydrogen pressure. As a result, the aforesaid advantage based on the employment of a high pressure is offset.

In order to suppress the production of methane due to the hydrogenation, there have been suggested some procedures for shortening a residence time. For example, a residence time of about 100 milliseconds or so is employed in the second process, but a curtailment of the residence time to such a degree is insufficient to restrain the production of paraffins. Moreover, in the third process, the residence time is further shortened down to an ultra-short residence time of 10 milliseconds or less, but in order to obtain the desired yield of olefins by shortening the residence time, it is necessary to set the reaction temperature at an ultra-high temperature of 1200° C. or more. As a result of such a temperature rise, however, the production of methane is only slightly reduced, and slight fluctuations in the temperature and residence time will lead to an abnormal variation in the yield of products. Accordingly, the economical operation of such processes is next to impossible.

An object of the present invention is thus to provide a new thermal cracking method for hydrocarbons by which olefins can be obtained in a highly enhanced yield from optional materials, without any fear of producing methane due to hydrogenation.

It has been found out that an atmosphere, in which a great amount of methane coexists with hydrogen under high-temperature and high-pressure conditions at a temperature of 800° to 1200° C. and a reaction pressure of at least 5 bars, is very useful for the production of olefins. The present invention is based on this newly found innovative knowledge.

The present invention provide a thermal cracking method for producing olefins from hydrocarbons which comprises the steps of mixing the hydrocarbons with a mixture of methane and hydrogen in a methane/hydrogen mol ratio of at least 0.2 prior to reaction; carrying out a thermal cracking reaction under conditions such that the total concentration of said methane and hydrogen is at least 40 mol% at the outlet of the reactor, a partial pressure of the hydrogen is at least 3 bars, the temperature at the outlet of the reactor is from 800° to 1200° C., and the residence time in the reactor is from 5 to 300 milliseconds; and quenching the reaction product discharged through the outlet of the reactor.

According to the present invention, methane is added intentionally and selectively to hydrogen in an amount which is about equal to that of the hydrogen under pressure, whereby:

(1) The production of methane due to hydrogenation can be completely prevented by controlling the concentration of hydrogen radicals with the aid of methane and by the function of produced methyl radicals ($CH_3 \cdot$) thereby maximizing the a yield of olefins.

(2) Ethane, ethylene, propylene and acetylene which are useful as products, are produced in the presence of sufficient amount of methane and hydrogen by the decomposition of the methane, therefore the yield of these useful components is highly increased, as compared with the case where a large amount of methane is not added.

(3) In addition to the above effects, since methane has a higher molar specific heat than hydrogen, the heat capacity of the gas increases, and the runaway condition of the reaction which is inherent in a hydrogenation reaction is avoided by the aforesaid function of methane for preventing the hydrogenation reaction. As a result, the yield distribution is scarcely affected by the fluctuation of reaction temperature, residence time or quenching time, so that an approximately constant yield distribution can be easily obtained. This feature is extremely effective to improve controllability and operability of the system.

(4) Further, thanks to the feature of the improved operability, a special reactor is not required. Furthermore, since the cooling time can be prolonged, heat recovery during quenching even with a heavy oil material increases to a substantial extent.

(5) As in the case of the conventional hydrogen atmosphere, the prevention of coking can also be accomplished also for the heavy oil material. Therefore, clogging by the coking can be avoided, so that a prolonged continuous operation is possible.

(6) Since there is generation of methane from olefins by the hydrogenation, severe thermal cracking at a high temperature and over a long period of time is allowable to increase the yield of BTX (benzene, toluene and xylene) up to a maximum level.

To sum up, according to the present invention, the generation of paraffins from olefins owing to the hydrogenation is restrained, therefore a decomposition temperature and a reaction time can be selected at optimum levels for the material to be cracked so as to obtain a maximum yield of ethylene, olefins (ethylene, propylene and the like) or olefins+BTX (benzene, toluene and xylene).

Thermal cracking according to the present invention will be further described in detail with reference to the accompanying drawings, in which.

Figure 1:
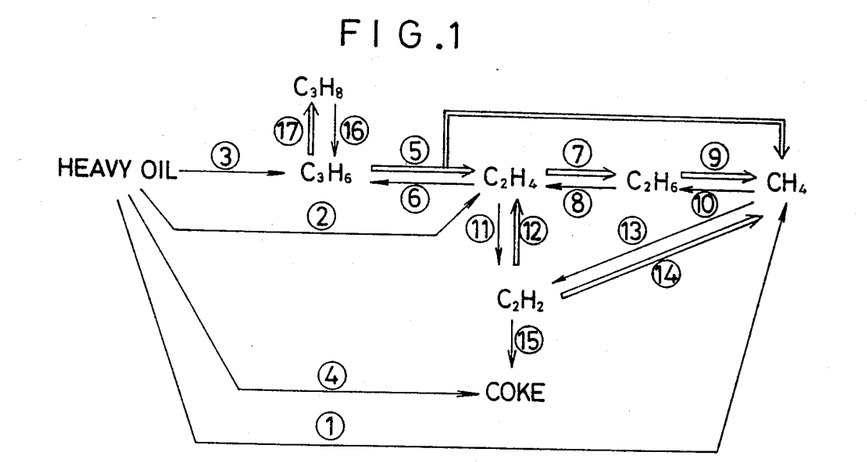
FIG. 1 is a diagramatic representation illustrating the reaction mechanism of a thermal cracking according to the present invention.

FIG. 1 illustrates the main components and main reaction channels in the thermal cracking method according to the present invention with the intention of explaining its features from the viewpoint of reaction mechanism. In FIG. 1 the double arrows indicated reaction channels in which hydrogen performs important functions. Although, needless to say, components and reactions other than exhibited in FIG. 1 also exist, there are omitted trace components and substances such as radicals which are generated transiently and do not remain in end products although playing important roles, and there are also omitted reaction channels regarding such components and substances. FIG. 1 principally indicates the reaction channels necessary to elucidate the function of methane in the presence of hydrogen. For the purpose of demonstrating that the method according to the present invention is effective especially for a heavy oil material the use of which has been avoided previously because of the low yield of olefins and the difficulty of prolonged stable operation due to problems such as coking. The example in FIG. 1 utilizes heavy oil as a feed material. The explanation of FIG. 1 can be likewise applied to materials other than the heavy oil, for example, LPG, naphtha, kerosine, light oil and the like, and the present invention, needless to say, is applicable to these materials.

In FIG. 1, a feed hydrocarbon material (in this case, it is the heavy oil) is decomposed into methane ($CH_4$), ethylene ($C_2H_4$), propylene ($C_3H_6$) and coke through channels 1, 2, 3 and 4 by thermal cracking reactions at a first step. Then, a minor portion of the formed propylene is hydrogenated through channel 17 to be converted into propane ($C_3H_8$), but a major portion of the propylene is decomposed into ethylene and methane, as indicated by channel 5, in accordance with the following formula (1):

$$C_3H_6 + H_2 \rightarrow C_2H_4 + CH_4 \tag{1}$$

The ethylene produced in the above-mentioned processes, i.e. channels 2 and 5 is converted into ethane ($C_2H_6$) and methane via channels 7 and 9 in accordance with the following formulae (2) and (3):

$$C_2H_4 + H_2 \rightarrow C_2H_6 \tag{2}$$

$$C_2H_6 + H_2 \rightarrow 2CH_4 \tag{3}$$

Here, when attention is paid to reactions of using methane as a starting material, channels 10, 8 and 6 can be presumed in which ethane, ethylene and propylene are formed in accordance with the following formulae (4), (5) and (6) reverse to the above-mentioned formulae (3), (2) and (1). Further, channels 13 (reaction formula (7)) and 12 via acetylene (C$_2$H$_2$) can be presumed:

$$2CH_4 \rightarrow C_2H_6 + H_2 \tag{4}$$

$$C_2H_6 \rightarrow C_2H_4 + H_2 \tag{5}$$

$$C_2H_4 + CH_4 \rightarrow C_3H_6 + H_2 \tag{6}$$

$$2CH_4 \rightarrow C_2H_2 + 3H_2 \tag{7}$$

Furthermore, as a channel for producing coke, condensation polymerization reaction channel 15 via acetylene can be presumed in addition to channel 4. These reactions in which methane is selected as a starting material are difficult to occur, unless a concentration of the methane is extremely high.

The foregoing explanation refers to the general thermal cracking reaction. The feature of the present invention resides in the utilization of an atmosphere including methane and hydrogen at a high concentration under pressure. The explanation will now be directed to the additional functions of hydrogen and methane in the these reaction channels.

The function of hydrogen will be discussed first. As in the conventional method, the temperature and pressure are at a high level. The reason is that the higher the temperature and pressure, the greater the activity of the hydrogenation becomes, and as a result there are prevented the generation and condensation polymerization (channel 4) of unstable polymers in a liquid phase which are causes of a coking phenomenon. Particularly in the case of the heavy oil material, the amount of hydrogen therein is low in comparison with carbon. Therefore additional hydrogen is supplemented from outside, whereby the amount of light gas increases by decomposition reactions (channels 1, 2 and 3) at the first step (the amount of the product obtained by channel 4 relatively decreases). Further, the amount of acetylene which is a precursor for coke is decreased with the aid of reactions (12) and (14), whereby production of coke from a gaseous phase is suppressed. However, hydrogen also has a disadvantageous function which should not be overlooked. Because of the presence of hydrogen, saturated products are liable to be generated by consuming olefins through channels 5, 7 and 17, specially under pressure. This phenomenon is the drawback of the conventional process discussed above. In the conventional process in which attention is paid only to the advantage of the pressurized hydrogen atmosphere, there is facilitated the reaction (channel 5) for decomposing, into methane and ethylene the propylene produced, and undesirable side reactions (channels 7 and 9) progress in succession. Even if quenching is carried out to freeze these reactions, it is inevitable that olefins are hydrogenated for a short cooling time, and as a result the production of methane and ethane increases noticeably. However, all of propylene and ethylene are not lost completely. This is the reason why the hydrogenation reactions in channels 7, 9 and 17 are merely relatively slower than the reactions in channels 2, 3 and 5. To overcome these problems in the thermal cracking method according to the present invention, both hydrogen and methanes are is added to the atmosphere before start of the reactions. Behavior of the method according to the present invention will be described in detail as follows:

The methane added to the atmosphere has the following function. When decomposition reactions of hydrocarbon material is started at a temperature high enough to advance them, the reactions have an inclination to proceed along channels 3, 5, 7 and 9 toward light and saturated components in succession, i.e. from propylene to methane through ethylene and ethane. When sufficient amount of methane, however, is added to the reaction atmosphere, the methane is converted into ethane, ethylene, acetylene and the like along channels 10, 8, 13 and 6 which are reverse to the abovementioned stream of from 3 to 9 through 5 and 7, whereby the conversion of olefins into methane due to hydrogenation is prevented. In addition thereto, the decomposition of methane is facilitated by regulating the reaction temperature and pressure as well as the methane/hydtrgen ratio in the atmosphere, so that the added methane can be converted into more valuable ethylene, ethane and acetylene. For example, in the preparation of ethylene from methane, the following reactions occur. At a high temperature, very active methyl radicals (CH$_3$·) are produced from methane, but they change into ethane by recombination, as shown by reaction formula (8) below. Further, a pull reaction (channel A) of hydrogen radicals (H·) from the ethane or a pull reaction of hydrogen molecules (channel B) occurs, resulting in the conversion of the ethane into ethylene via ethyl radical (C$_2$H$_5$·) or directly.

(8)

With mixtures of hydrogen and methane, the methyl radicals are produced by reaction formula (9) below.

(9)

Therefore, as is clear from reaction formula (9), in the presence of a sufficient amount of methane, the reaction proceeds in the right direction in the formula, and thus the hydrogen radicals change into molecular hydrogen, so that concentration of the hydrogen radicals decreases and concentration of the methyl radicals increases instead. In this manner methane behaves an absorber for the hydrogen radicals, therefore it can prevent the hydrogenation reaction of olefins due to the hydrogen radicals. Further, a dehydrogenation reaction due to the hydrogen pull function of methane is facilitated, so that the production of olefins is accelerated, and simultaneously methane is converted into ethane and ethylene by the recombination of the formed methyl radicals, as mentioned above. Accordingly, methane not only serves as a diluent but also contributes drastically to the increase in a yield of ethylene by a reactive mechanism as described above. It has thus been found that the aforementioned process is noticeably different in mechanism and effect from the conventional technique in which the hydrogen atmosphere is diluted only with inert material.

Moreover, in the conventional method, reactions are exothermic because by thermal cracking of the hydrogenation in the pressurized atmosphere of hydrogen or including a large supply of hydrogen, and reaction operations are required to be carried out in a runaway system. In contrast, the thermal cracking method according to the present invention employs a reaction atmosphere including methane and hydrogen simultaneously. Therefore the reactions involving methyl radicals predominate, and these are endothermic. Accordingly, these reactions behave as if the wall of the reactor had been cooled to remove the heat. The reaction mixture is thus quenched during the progress of the reactions, so that no runaway reactions occur.

Also with regard to yield characteristics of the reactions, a substantially unchanged yield range (plateau range) exist in the system, irrespective of variation in a reaction time and reaction temperature. In addition to the above, since a molar specific heat of methane is about 2.5 times as much as that of hydrogen, the reaction temperature is difficult to vary.

As described above, the effect due to the presence of sufficient amount of methane is epochal and is not foreseeable at all from separate employment of hydrogen or methane. It is a feature of the thermal cracking method according to the present invention to utilize positively this particular function of methane in this way.

Now, differences between reactions in which methane is added and other reactions where a gas other than methane is added will be described with reference to FIGS. 2 to 5.

Figure 2:
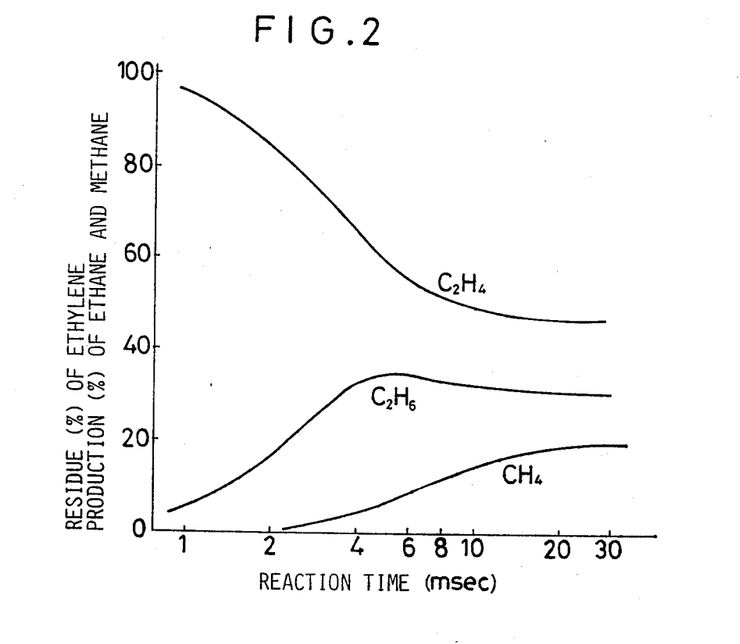
FIG. 2 is a graph showing the relation between percentage of residual ethylene and the percentage of produced ethane and methane and reaction time when hydrogen without methane is employed.

FIG. 2 is a graph showing a percentage of residual ethylene and the respective production percentages of ethane and methane produced by the conversion of carbons in the ethylene into other components in the case that a mixed gas comprising 10 mol% of ethylene and 90 mol% of hydrogen was allowed to react at a temperature of 1000° C. and under a pressure of 24 bars. As is apparent from the graph, the amount of ethylene converted into ethane decreases sharply owing to the presence of the pressurized hydrogen, and increasing amounts of methane are produced. When the reaction time passes 10 milliseconds, as much as 50% of the ethylene is consumed.

Figure 3:
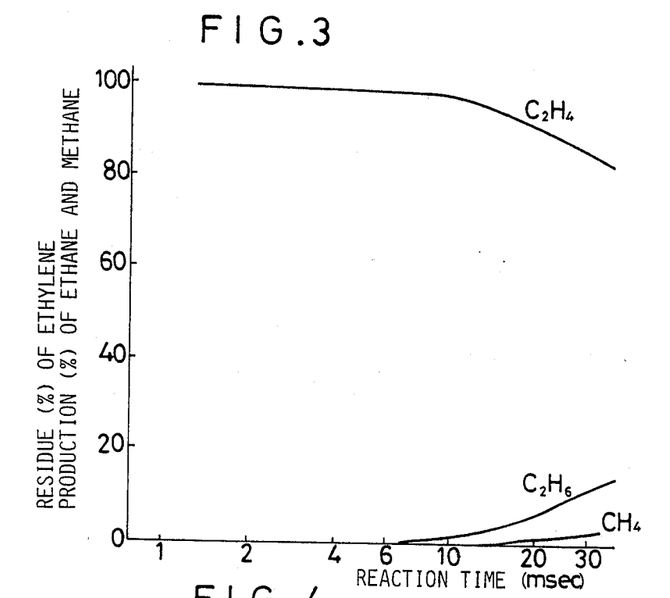
FIG. 3 is a graph showing the relation between a percentage of residual ethylene and the percentage of produced ethane and methane and a reaction time using a mixture of hydrogen and methane.

In contrast, FIG. 3 is a graph showing a percentage of residual ethylene and the respective generation percentages of ethane and methane produced by the conversion of carbons in the ethylene into other components in the case that a mixed gas, which was obtained by adding methane to the previous example, comprising 10 mol% of ethylene, 45 mol% of hydrogen and 45 mol% of methane was allowed to react at a temperature of 1000° C. and under a pressure of 24 bars. As will be seen from FIG. 3, the percentage of the reacted ethylene is noticeably low at an early stage, and even when 10 milliseconds have passed, as much as 98% of the ethylene remains. Even after 30 milliseconds an amount of the formed methane is very small, as compared with the system (FIG. 2) in which no methane is added.

Figure 4:
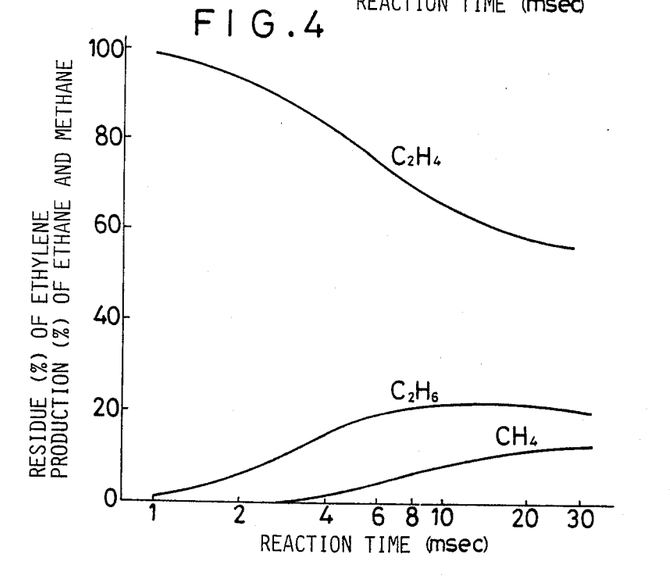
FIG. 4 is a graph showing the relation between percentage of residual ethylene and the percentage of produced ethane and methane and reaction time under coexistence with nitrogen.

FIG. 4 is a graph showing a percentage of residual ethylene and the respective generation percentages of ethane and methane which were produced by the conversion of carbons in the ethylene into other components in the case that a mixed gas, where nitrogen was added for comparison, comprising 10 mol% of ethylene, 45 mol% of hydrogen and 45 mol% of nitrogen was allowed to react at a temperature of 1000° C. and under a pressure of 24 bars. As is clear from the graph, when the partial pressure of hydrogen is low, the conversion rate of the ethylene decreases but is still much greater than an ethylene conversion rate in the methane-including system in FIG. 3. This fact indicates that the aforesaid effect of methane is a function inherent in methane itself, as described above, rather than a drop in the partial pressure of hydrogen.

Figure 5:
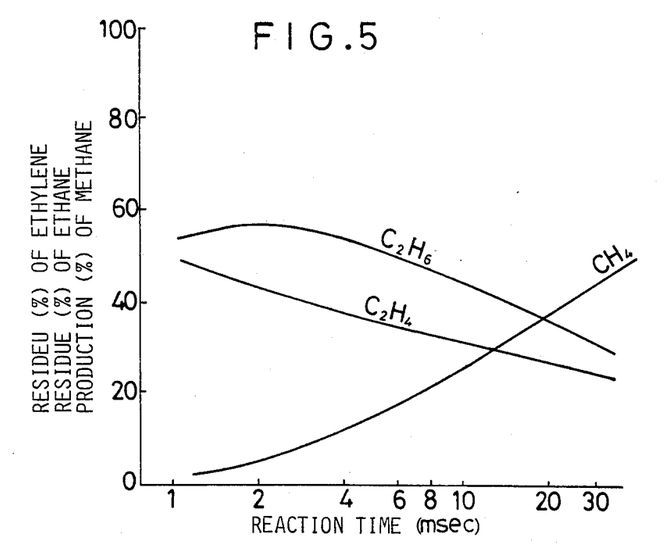
FIG. 5 is a graph showing the relation between the percentage of residual ethylene, ethane and methane and reaction time under coexistence with ethane.

FIG. 5 is a graph showing the respective percentages of residual ethylene and ethane as well as a generation percentage of methane produced by a conversion of carbons in the ethylene and ethane in the case that a mixed gas, where ethane was added in place of methane, comprising 10 mol% of ethylene, 10 mol% of ethane and 80 mol% of hydrogen was allowed to react likewise at a temperature of 1000° C. and under a pressure of 24 bars.

In FIG. 5, the percentages of the residual ethylene and ethane are represented on the basis of considering the total amount of the ethylene and ethane at an early stage as 100%.

The system regarding FIG. 5 is clearly different in the reaction and production of each component from the system shown in FIG. 3 in which methane is added. In the latter system where methane is added, the reaction percentage (conversion percentage) of ethylene is very low, whereas in the former system where ethane is added in place of methane a large amount of, ethylene is converted into ethane which is then converted into methane.

As supported by the comparative differences between FIGS. 3 and 5, added methane performs a specific effect. Moreover, in the case of FIG. 5, the amount of formed methane is very high compared to the case of FIG. 2, but if a steam cracking is carried out for ethane, 85% or more of the ethane is converted into ethylene, whereby the conversion percentage into methane can be suppressed below 10%. On the contrary, when mixed with hydrogen, a large amount of ethane is disadvantageously converted into methane. The above discussed tendency is observed also when a paraffin other than methane is used, and thus the described effect of methane is specific to methane.

Figure 6:
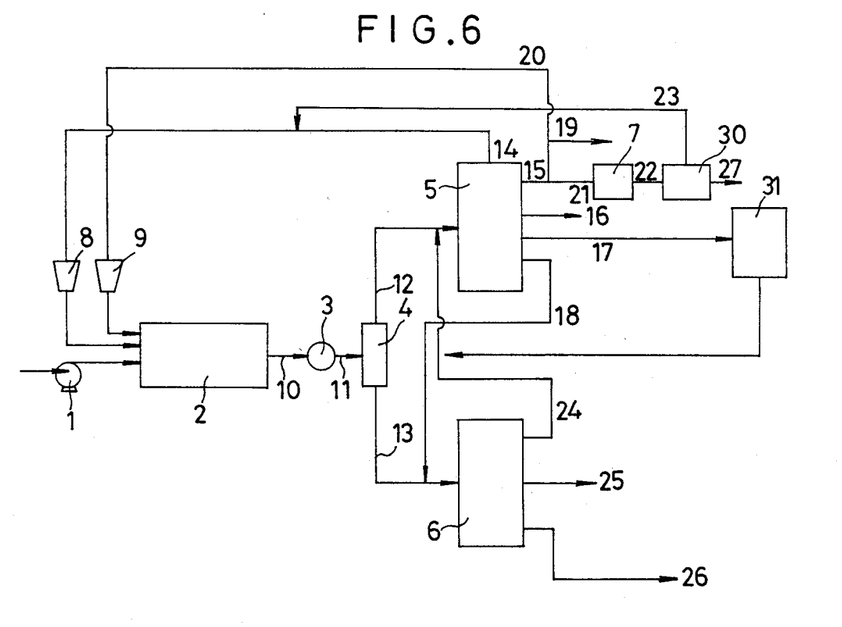
FIG. 6 is a flow chart illustrating an embodiment according to the present invention.

FIG. 6 is a flow chart explaining a one embodiment of this invention on an industrial scale. In FIG. 6, a feed hydrocarbon material is pressurized to a predetermined pressure by means of a pump 1, and is then fed to a thermal cracking device 2 having a suitable heating zone and reaction zone. The supply of heat energy necessary to preheat the reaction medium (a mixture of the hydrocarbon material, methane and hydrogen) in the thermal cracking device and to retain reactions is accomplished by heating the mixture from outside through a wall of the reactor, by partially burning methane and hydrogen gas alone or combination, before they are mixed with the reaction mixture or hydrocarbon material, or by mixing the reaction medium with hydrogen, a steam, a plasma or the like which was previously heated in another manner. In the thermal cracking device 2, thermal cracking reactions occur under the influence of hydrogen radicals and methyl radicals as mentioned above to produce the reaction mixture 10 including olefins in a major proportion therein, and immediately the fluid is fed to a quenching heat exchanger 3 to quench it therein.

As a quenching heat exchanger 3, there may be employed, for example, a direct heat exchanger for spraying directly water or an oil to the reaction mix, an indirect heat exchanger for heat exchanging between two fluids inside and outside a pipe or a two-step combination of both.

Then, the quenched reaction mix 11 is forwarded to a gas-liquid separator 4, where it is separated into a gas phase 12 and a liquid phase 13, and they are fed to a gas separating section 5 and a liquid separating section 6, respectively. In the gas separation section 5, the fed gas is separated into hydrogen 14, $CH_4$ 15, olefins 16 such as $C_2H_4$ and $C_3H_6$, paraffins 17 such as $C_2H_6$ and $C_3H_8$ and heavy components 18 such as $C_4$ components and heavier components.

In the thermal cracking method according to the present invention, it is not always necessary to separate the hydrogen and methane completely. This tolerance is economical. The separated hydrogen 14 is mixed with make-up hydrogen 23 and is pressurized again by a compressor 8 for hydrogen to be recycled for reactions. The majority of the methane 15, after a portion thereof is removed as a product 19, is caused to pass through a line 20, and is pressurized by a compressor 9 for methane in order to be recycled for reactions. Another portion of the methane 15 is introduced into a steam reformer 7 through a line 21 so as to be converted into hydrogen, and the thus prepared hydrogen is fed to a gas purification section 30, where compound 27 such as CO and $CO_2$ are removed, and the refined hydrogen is mixed with the recycling hydrogen 14 via a line 23.

On the other hand, in the liquid separator 6, the liquid is separated into gas components ($H_2$ and $C_1$ to $C_3$) 24, $C_4$ components and various fractions 25 and residue 26. The paraffin components 17 such as ethane and propane are forwarded to a steam cracking device 31, where ethylene and propylene are recovered.

The present invention will be further described in detail in accordance with the following example. It should be noted that the example merely is to explain the present invention but does not intend to restrict the same.

EXAMPLE

A selected liquid hydrocarbon material was sprayed into a reactor in which methane and hydrogen were flowing at a high temperature and under a high pressure, and the resulting reaction mixture comprising the hydrocarbon material, methane and hydrogen was guided, in the state of parallel flow, toward an outlet of the reactor. A direct quench was carried out by spraying water at the outlet, and the composition of the gas phase and the amount of formed coke were analyzed.

The high-temperature and high-pressure atmosphere comprising the mathane and hydrogen was prepared as follows: The hydrogen and methane were previously and separately preheated to 400° to 800° C., oxygen was then blown into the methane to burn it partially and to thereby prepare heated methane. A suitable amount of the hydrogen was then mixed with the heated methane to generate the desired atmosphere. If the $CH_4/H_2$ ratio is low, the of hydrogen may be burned for the acquisition of the desired atmosphere. A similar effect is obtained by partially burning a previously prepared a mixture of the methane and hydrogen. The reaction time was determined by calculation, taking a volume of the used reactor and reaction conditions into consideration. The employed hydrocarbon material was vacuum residual oil (specific gravity 1.02, sulfur content 4.3% and flow-point 40° C.) from the Middle East.

The used reactor has a burning area, at an upper portion thereof, where methane was partially burned with oxygen; a hydrogen-feeding orifice under the burning area; an asphalt burner on an inner wall of the reactor itself; an outlet for a reaction product at a lower position of the reactor itself; and a directly connected cooling portion under the outlet.

Figure 7:
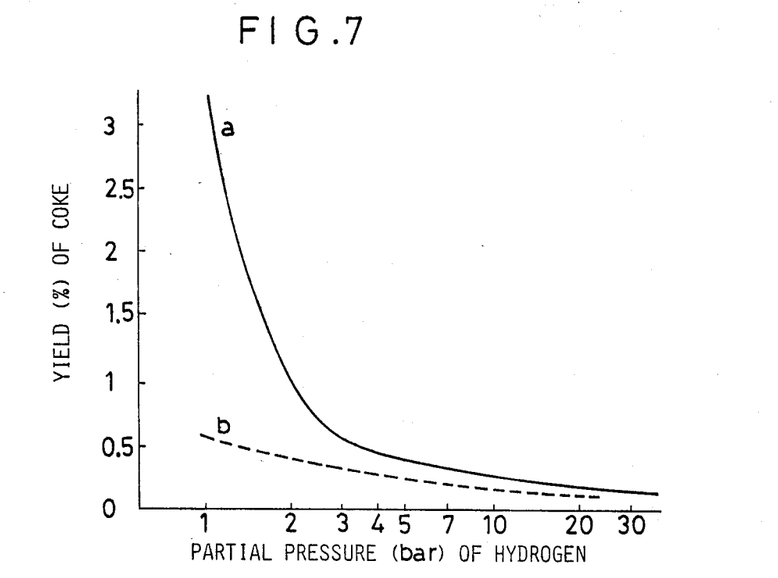
FIG. 7 is graph showing the relation between yield of coke and partial pressure of hydrogen.

FIGS. 7 to 12 exhibit the relations between reaction conditions and various yields. FIG. 7 is a graph showing the relation between partial pressure of hydrogen and yield of coke in the case when the vacuum residual oil from the Middle East and kerosine were cracked at 950° C. and in a $CH_4/H_2$ mol ratio of less than 1, and a and b in the drawing represent results regarding the vacuum residual oil and the kerosine, respectively. As be apparent from this drawing, the amount of the formed coke decreases remarkably by increasing the partial pressure of the hydrogen, and if the partial pressure is maintained at a level of 3 to 5 bars or more, the yield of the coke can be suppressed down to an extremely low level. For a comparison with the heavy oil, FIG. 7 further exhibits a case where kerosine as a light oil was used, and also in this case, the formation of the coke is suppressed by increasing the partial pressure of the hydrogen. However, it is clear therefrom that an effect of this partial pressure is greater with the heavy oil. Incidentally, when vacuum residual oil was cracked in hydrogen at atmospheric pressure, the formed coke clogged the reactor instantaneously.

Figure 8:
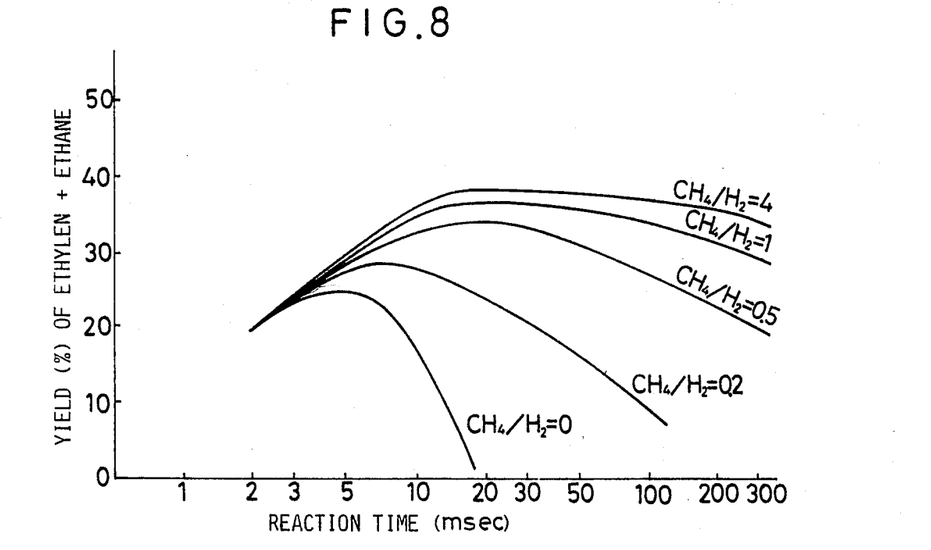
FIG. 8 is graph showing the relation between yield of ethylene and ethane and reaction time.

FIG. 8 is a graph showing the relation between a yield of ethylene and ethane and a reaction time in accordance with methane/hydrogen mol ratios as parameters when vacuum residual oil from the Middle East was cracked at 950° C. at the outlet of the reactor under 20 bars in a mixture of methane and hydrogen. As is apparent from the graph, as the proportion of the methane increases, the yield of the ethylene and ethane is raised and the variation of the obtained yield to the reaction time is small, which means that the distribution of the yields is stabilized. The proportion of the ethylene which is involved in the yield of the ethylene and ethane is 70 to 80% when the methane/hydrogen mol ratio is 1. These results indicate that the yield of the ethylene will be 32 to 35% if the methane/hydrogen mol ratio is set to 0.2 or more, which yield is substantially higher compared with a yield of ethylene of 14 to 15% in the case of hydrogen only ($CH_4/H_2=0$), and the fluctuation of the yield to the reaction time can be noticeably improved. Further, it is understood from this graph that the preferable reaction time ranges as extensive as 5 to 300 milliseconds.

Figure 9:
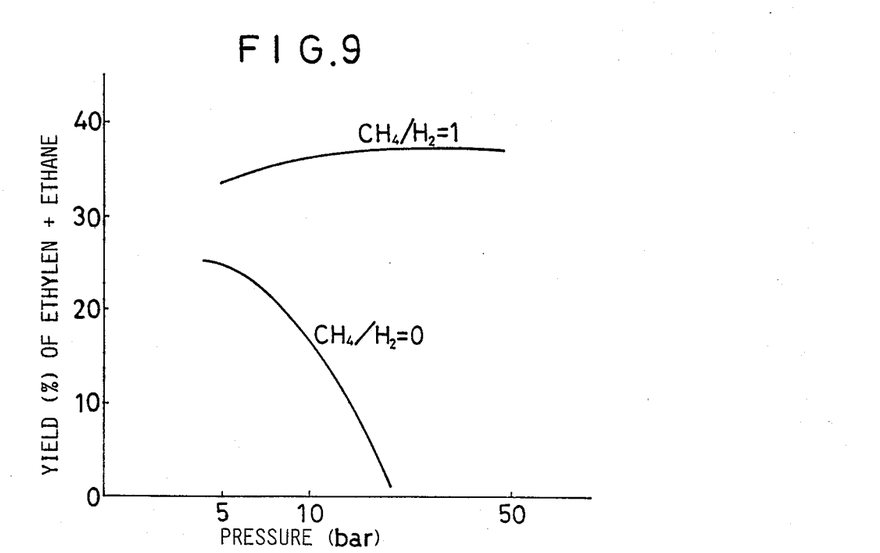
FIG. 9 is a graph showing the relation between yield of ethylene and ethane and pressure.

FIG. 9 is a graph showing the relation between a pressure and a yield of ethylene and ethane when vacuum residual oil from the Middle East was cracked at a temperature of 950° C. at the outlet of the reactor for a reaction time of 20 milliseconds in a methane/hydrogen mol ratio of 1 and 0 (hydrogen only). As is clear from the graph, the influence of the pressure on the yield of the ethylene and ethane is minimal when the $CH_4/H_2$ ratio is 1, but in the system where no methane is added, the ethylene and ethane are abruptly converted into methane with the increase in the pressure, so that the yield of the ethylene and ethane lowers remarkably.

Figure 10:
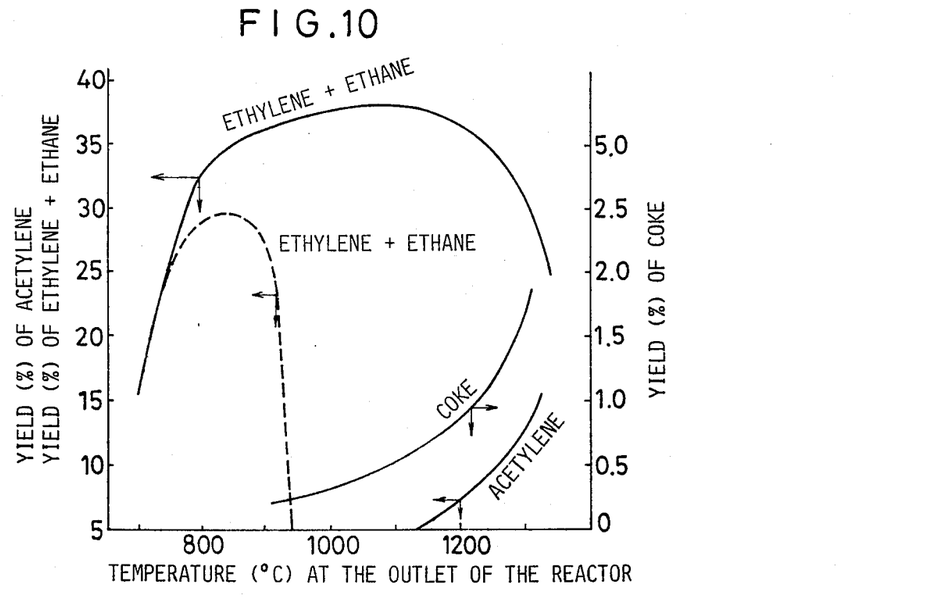
FIG. 10 is a graph showing the relation between yield of ethylene and ethane, acetylene and coke and temperature at the outlet of reactor.

FIG. 10 is a graph showing an influence of temperature at the outlet of the reactor when vacuum residual oil from the Middle East was cracked under a reaction pressure of 20 bars for a reaction time of 20 milliseconds in a methane/hydrogen mol ratio of 1 and 0 (hydrogen only). In this graph, the solid lines represent systems where methane is added, and a dotted line represents a system where no methane is added.

As is clear from the drawing, the yield of ethylene and ethane in the system where methane is added does not vary appreciably at a temperature of 800° to 1200° C. at the outlet of the reactor. Below 800° C., however, the reaction rate drops noticeably, therefore the yield of the ethylene and ethane also falls sharply. On the other hand, at a higher temperature, acetylene is produced by dehydrogenation of the ethylene and decomposition of methane. When the temperature exceeds 1200° C., generation of acetylene is remarkable and the yield of the ethylene and ethane drops sharply. In consequence, the formation of coke increases, which fact would be attributable to the polycondensation of the acetylene. On the other hand, in a system where no methane is added, hydrogenation of the ethylene and ethane progresses abruptly with temperature rise, so that the yield of ethylene and ethane lowers sharply. The difference between the two systems is based on the addition of methane.

Figure 11:
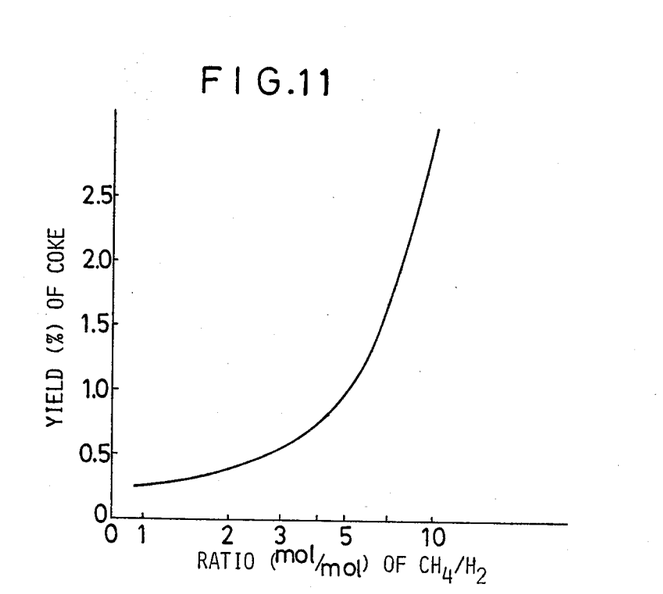
FIG. 11 is graph showing the relation between yield of coke and a $CH_4/H_2$ ratio.

FIG. 11 is a graph showing the relation between methane/hydrogen mol ratio and a yield of coke when vacuum residual oil from the Middle East was cracked under a partial pressure of hydrogen of 10 bars at a temperature of 950° C. at the outlet of the reactor for a reaction time of 20 milliseconds. As the proportion of added methane to hydrogen increases, a yield of ethylene and ethane also increases as shown in FIG. 8, and the yield of the coke increases as the proportion of the added methane increases as shown in FIG. 11, even under conditions of a constant partial pressure of the hydrogen. An increase in the yield of the coke depends greatly on the temperature and pressure, but in order to suppress the generation of the coke, when the reaction temperature is within the range of 900° to 1000° C. and the partial pressure of the hydrogen is 10 bars or so, the methane/hydrogen mol ratio is preferably 4 or less.

Figure 12:
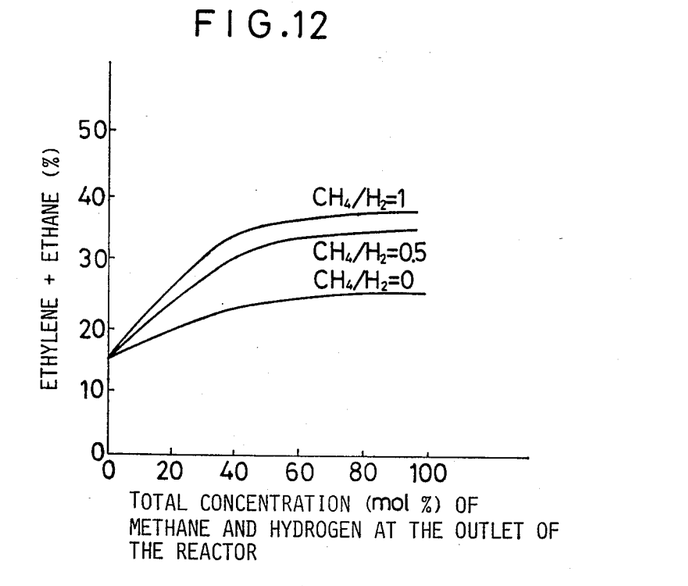
FIG. 12 is graph showing the relation between yield of ethylene and ethane and a total concentration of methane and hydrogen at the outlet of the reactor.

FIG. 12 is a graph showing the relation between a total concentration of methane and hydrogen at the outlet of the reactor and a yield of ethylene and ethane when vacuum residual oil from the Middle East was cracked at a temperature of 950° C. at the outlet of the reactor under a reaction pressure of 20 bars for a reaction time of 20 milliseconds under conditions of methane/hydrogen mol ratios being 1, 0.5 and 0 (hydrogen only). In this case, steam is added as a residual gas to regulate the concentration of the methane and hydrogen. FIG. 12 clearly indicates that the yield of the ethylene and ethane is adequate only when the total concentration of the methane and hydrogen is 40 mol% or more. Incidentally, the results set forth in FIGS. 7 to 11 are on the basis of the conditions that the total concentration of methane and hydrogen is 60 mol% or more.

Judging from the example described above, and respective ranges to make the present invention effective are as follows: First, with regard to the reaction pressure, for prevention of coking, a suitable partial pressure of hydrogen is at 3 bars, preferably 5 bars or more. With regard to the proportion of methane to be added, when a methane/hydrogen ratio is 0.2 (mol/mol) or less, an effect of the methane is small, and on the other hand, when it is 4 (mol/mol) or more, a yield of coke is great even if a partial pressure of hydrogen is maintained at 3 bars or more. Therefore, a suitable methane/hydrogen ratio is 0.2 to 4, preferably 0.5 to 4 (mol/mol). Further, it should be noted that when a total concentration of methane and hydrogen in a reaction atmosphere is low, the effect of the added methane is insufficient. In order to obtain a satisfactory effect of the methane and hydrogen, a suitable total concentration of both is 40 mol% or more at the reaction outlet, preferably 60 mol% or more. With regard to a residence time of reactions, for acquisition of a good yield of olefins, it is within from 5 to 300 milliseconds, preferably 10 to 100 milliseconds. Moreover, the reaction temperature is preferably within 800° to 1200° C.

According to the present invention, there is provided an industrially useful thermal cracking method for producing olefins from hydrocarbons in an extremely enhanced yield and with an reduced amount of coke.

We claim:

1. A thermal cracking method for producing olefins from hydrocarbons which comprises the steps of forming a mixed gas of methane and hydrogen in a methane/hydrogen mol ratio of 0.1 to 4 together with the hydrocarbons prior to the thermal cracking reaction; and reacting the mixture under conditions that the total concentration of said methane and hydrogen is at least 40 mol% at the outlet of a reactor, the partial pressure of said hydrogen is at least 3 bars, the temperature at the outlet of said reactor is from 800° to 1200° C., and the residence time in said reactor is from 5 to 300 milliseconds; and quenching the reaction product discharged through the outlet of said reactor.

2. A thermal cracking method according to claim 1 wherein said mixed gas of methane and hydrogen has a methane/hydrogen mol ratio of 0.5 to 4.

3. A thermal cracking method according to claim 1 wherein said partial pressure of the hydrogen is at least 5 bars.

4. A thermal cracking method according to claim 1 wherein said residence time in the reactor is within the range of 10 to 100 milliseconds.

* * * * *